Jan. 15, 1929.  W. G. FISHER  1,699,057
TRACTOR WHEEL
Filed Sept. 23, 1926   2 Sheets-Sheet 1

Inventor
Walter George Fisher, Deceased
by Lew May Fisher, Administratrix
by Fetherstonhaugh & Co.
Attys.

Jan. 15, 1929.                    W. G. FISHER                    1,699,057
                                  TRACTOR WHEEL
                              Filed Sept. 23, 1926              2 Sheets-Sheet 2
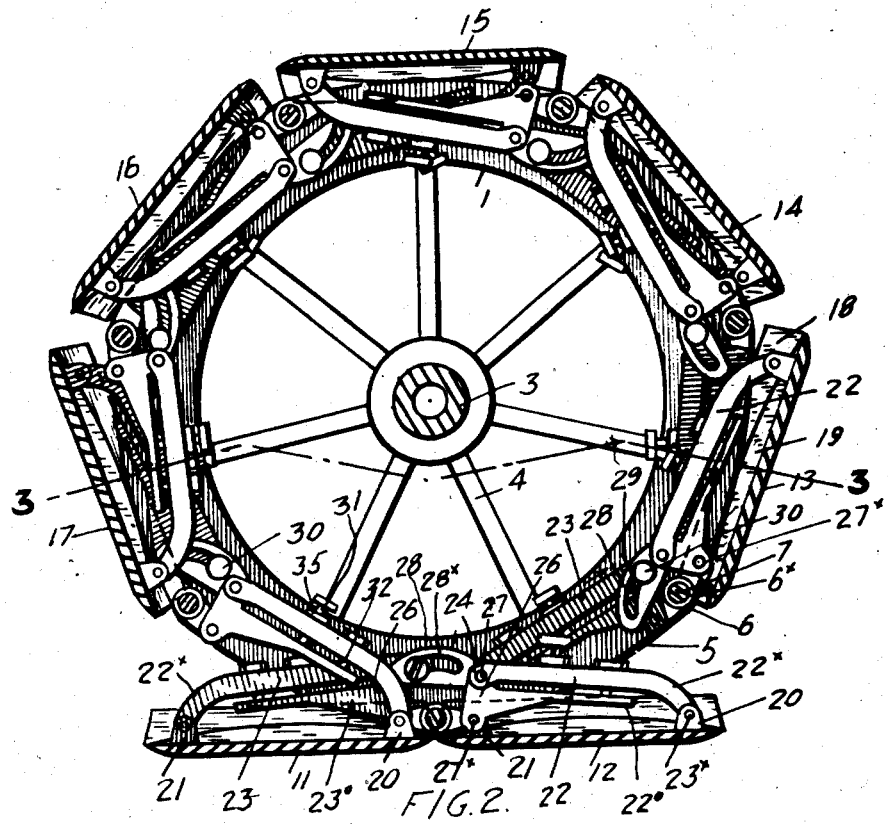
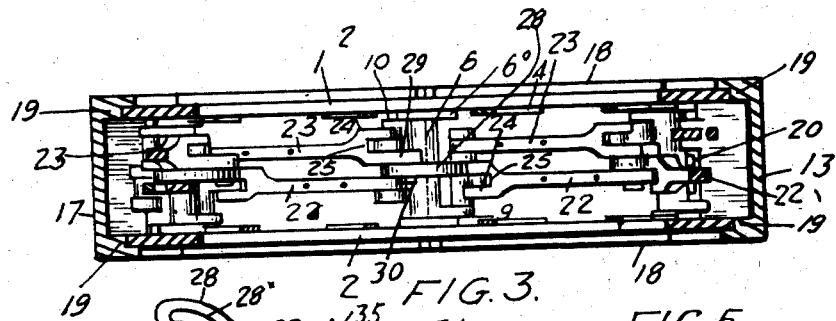
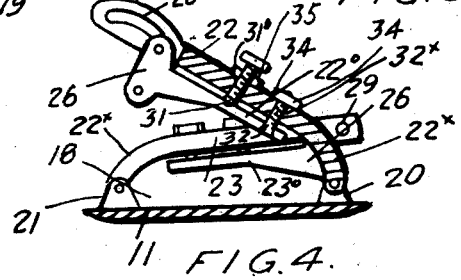
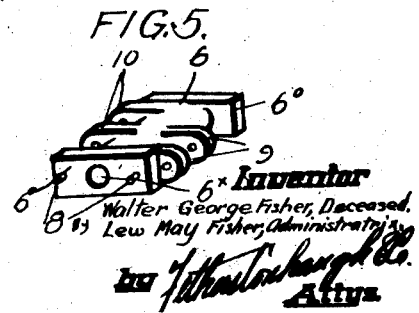

Patented Jan. 15, 1929.

1,699,057

UNITED STATES PATENT OFFICE.

WALTER GEORGE FISHER, DECEASED, LATE OF ORANGEVILLE, ONTARIO, CANADA, BY LEW MAY FISHER, ADMINISTRATRIX, OF ORANGEVILLE, CANADA.

TRACTOR WHEEL.

Application filed September 23, 1926. Serial No. 137,350.

The invention relates to improvements in tractor wheels, of the type disclosed in the inventor's United States Patent #1,486,236, dated 11th day of March, 1924, and in his Canadian Patent #195,156, dated 23rd day of December, 1919, and the object of the present invention is first to prevent slippage between the tread plates and wheel body and thereby insure of an even smooth movement of the wheel as it travels over the surface of the ground. Secondly to insure of the tread plates being firmly held definitely in all positions as they travel around by the rotation of the wheel body. And thirdly to dispense with all springs which are liable to wear out and in which mud is liable to congregate and clog the device, and it consists essentially of the arrangement and construction of parts as hereinafter more particularly explained.

Fig. 2 is a similar view to Figure 1 showing the wheel rotated a part turn during its travel from one tread plate to the next adjacent tread plate and showing the reverse side to Figure 1.

Fig. 3 is a sectional plan view on line 3—3 Figure 2.

Fig. 4 is a sectional detail through one of the tread plates and one of the operating levers thereof.

Fig. 5 is a perspective detail of one of the spacing members of the wheel body.

In the drawings like characters of reference indicate corresponding parts in each figure.

Figure 1:
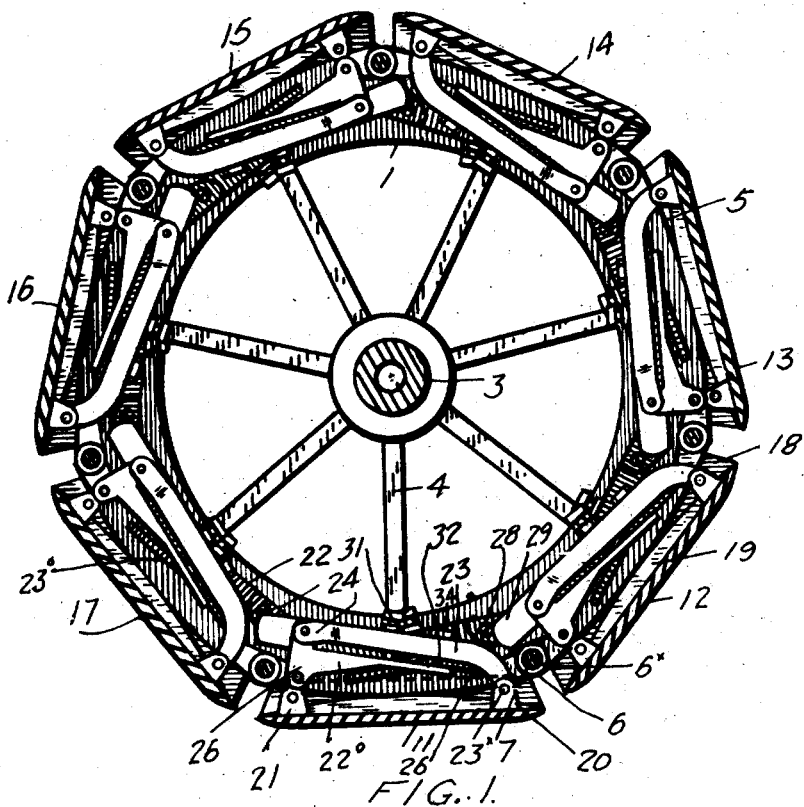
Fig. 1 is a sectional view through the tractor wheel showing it supported upon one of the tread plates.

The wheel body comprises a pair of annular plates 1 and 2 spaced apart and forming the faces of the wheel and connected to a hub 3 by spokes 4. The outer periphery of each plate 1 and 2 is multi-sided, each side being arced as indicated at 5. 6 are spacing members which extend between the plates 1 and 2 at suitable distances apart and each spacing member is provided with a central orifice 6$^x$ through which a securing bolt 7 extends. The ends of the members 6 are provided with rectangular plate like enlargements fitting against each inner face of the annular plates 1 and 2 and through which securing means, such as screws or rivets 8 extend so as to prevent the spacing members 6 turning upon the bolts 7. Each spacing member is provided with a pair of lugs 9 extending laterally therefrom in one direction and adjacent one end thereof and a pair of lugs 10 extending in the opposite direction and adjacent the opposite end thereof.

11, 12, 13, 14, 15, 16, and 17 are tread plates arranged in succession around the periphery of the wheel, a tread plate being opposite each wheel side. Each plate 11 to 17 is provided with side flanges 18 which extend to the outside of the plates 1 and 2. At the inside of each flange 18 is located an arc-shaped bearing portion 19 opposing each arc-shaped side of the plates 1 and 2.

When in operation an arc-shaped portion 5 travels upon a bearing portion 19, the portions 5 and 19 being of the same radius so that as the wheel travels one rolls around in contact with the other.

Each plate 11 to 17 is provided at one end with a pair of lugs 20 located at one side of the longitudinal centre of the plate and in proximity to one end thereof and similar lugs 21 located at the opposite side of the longitudinal centre of the plate and in proximity to the opposite end of the plate.

A composite lever mechanism comprising the members 22, 23, 22° and 23° is pivotally connected at the ends between each pair of lugs 20 and 21, the ends of the members being preferably curved downward to between the lugs as indicated at 22$^x$ and pivotally connected therebetween by pivot pins 23$^x$. The curved end 22$^x$ of the member 22 is connected to the lugs 20 of one plate and the corresponding end of the member 23 to the lugs 21 of the next adjacent plate. The members 22 and 23 of the levers are provided adjacent their opposite or inner ends with lugs 24 forming a fork 25. The lever member 22° extends beneath the member 22 and the member 23° beneath the member 23 and each is provided with an enlargement 26 at that end corresponding to the end of each lever 22 and 23 having the fork 25. The upper end of each enlargement 26 is formed into a lug extending into the fork 25 and is pivotally connected therein by a pin 27 extending through the lug 24 into the body of the lever member 22 forming the opposite side of the fork. The lower end of the enlargement is also formed into a lug, the lugs of each enlargement extending beneath the lever members 22 extending between the lugs 9 and that beneath the lever 23 between the lugs 10.

Pins 27ˣ extend through the lugs 9 and 10 and the inserted lower lugs of the enlargements 26. From the foregoing it will be seen that the levers 22 and 23 extend in opposite directions so that one member 22 of each lever mechanism is pivotally connected between the lugs 20 and the corresponding end of each lever member 23 between the lugs 21, such lever mechanism bridging each successive pairs of tread plates 11 to 17 and extending from the outer end of one plate to the opposite end of the other plate in an overlapping criss cross formation relative one to the other. Each lever member 22 at the opposite end to that which is connected between the lugs 20 is provided with an extension 28, each of such extensions being provided with an arc-shaped slot 28ˣ. Each lever 23 is provided with an extension 29 overlapping the extension 28 of the lever 22 of the next tread plate in succession.

30 is a headed pin or screw passing through each slot 28ˣ into the overlapping portion of the extension 29. Each lever member 22 is connected to the lever member 22° and each lever member 23 to the member 23° by a pair of adjusting screws 31 and 32, see Figure 4. The screw 32 is permanently secured in the member 22° and extends freely through an orifice 32ˣ formed in the lever member 22. The screw 31 passes through a threaded orifice 31° formed in the lever member 22 and bears at its lower end against the lever member 22° and is provided with a locknut 35 also bearing against the upper face of the lever member 22.

From the foregoing it will be seen that each successive tread plate is tied by two pairs of lever mechanism in criss cross relation one to the other to a tread plate on each side thereof such as the plate 11 which is tied to the plate 17 on one side thereof and to the plate 12 on the opposite side thereof, this connection being made from plate to plate as will be clearly seen on referring to Figure 2.

The principal parts involved in the invention have been described; now follows a brief description of the operation thereof.

The wheel when resting squarely upon one tread plate 11 as illustrated in Figure 1 when it starts to travel rolls around the tread portion 19 of the tread plate 11 until the arc-shaped edge 5 of the corresponding side of each plate 1 and 2 of the wheel body meets at its end with the end of the tread portion 19. As this takes place the next succeeding tread plate 12 is brought at its lower end into contact with the ground and in the endwise position to the plate 11, the lower end of the tread portion 19 of the plate 12 being thereby forced upward into rolling contact with the corresponding edge 5 so that the lower end thereof contacts with the lower end of the arc-shaped edge 5 of the corresponding side of each plate 1 and 2 assuming the position shown in Figure 2. This movement produces a slightly longitudinal movement of the lever members 22 and 23 connecting the tread plates 12 and 13 as indicated by arrow in Figure 2 exerting a thrust upon such levers towards the upper end of the plate 13 by reason of the headed pin 30 engaging the end of the slot 28ˣ. By this action the lever member 22 is swung on its pivot pin 27ˣ thereby producing an outward swinging movement of the lever 22 at its upper end. The tread plate 13 as it passes from the position illustrated in Figure 1 to the position illustrated in Figure 2 is carried at its lower end closely adjacent to the edge or periphery of the wheel body so that when brought into contact with the ground it will so engage therewith as to be forced into closer contact at its end with the wheel periphery allowing the wheel to travel smoothly from one tread plate to another.

From this description it will be seen by reason of the rolling contact between the tread plates and the wheel body and the lever connection from one tread plate to another whereby the rolling action is effected that each plate will be held in definite relation to the wheel body in all positions so that there will be no rattling or lost motion and by reason of the rolling contact of the wheel body with the tread plates as the wheel body travels from one plate to the next adjacent the travel of the wheel will be smooth and even over the surface of the ground.

What is claimed is—

1. In a tractor wheel, a wheel body formed with a multisided periphery having each side arced convexedly, tread plates having arc-shaped treads opposing and contacting with the aforesaid arc-shaped sides of the body, and means for flexibly tying the plates to the body to carry them from a centrally contacting tangential position in relation to the body to a horizontal endwise position on the ground forward of and in the path of the wheel as the wheel rotates.

2. A tractor wheel comprising a wheel body formed by two multisided plates spaced apart and tied rigidly together and having each side edge arced convexedly, a series of tread plates, a plate being located opposite each side of the wheel body and having an arced shape tread portion opposing the arc-shaped edge of the wheel body and of the same radius and length of arc, and a lever connection between each pair of successive tread plates and the wheel body permitting continuous travel of the wheel body parallel with the ground.

3. In a tractor wheel, a wheel body having a multisided periphery, each side of which is arced convexedly, a tread plate located centrally opposite each side and having an arced tread opposing the side of the body, a lever device pivoted at one end of each tread plate and pivotally mounted at its opposite end on the wheel body, a lever device pivoted at one end to that end of the next adjacent tread plate remote from the aforementioned tread plate end and at its opposite end to the wheel body, and a link connection between the inner ends of the lever devices.

4. In a tractor wheel, a wheel body having a multisided periphery, each side of which is arced convexedly, a tread plate located centrally opposite each side and having an arced tread opposing the side of the body, a lever device pivoted at one end of each tread plate and pivotally mounted at its opposite end on the wheel body, a lever device pivoted at one end to that end of the next adjacent tread plate remote from aforementioned tread plate end and at its opposite end to the wheel body, and a link connection between the inner ends of the lever devices, and comprising a slotted extension to the inner end of one lever device, an extension to the other lever device overlapping the aforesaid extension, and a projection extending from the extension last mentioned into the slot of the extension overlapped thereby.

5. In a tractor wheel, a wheel body, and a plurality of tread plates associated therewith, flexible connections between said wheel body and tread plates, each of said tread plates being of an over all length less than the arc of said wheel body subtended thereby, the summation of the wheel contacting surfaces of said plates being equal to the periphery of said wheel body.

6. In a tractor wheel, a wheel body, and a plurality of tread plates therefor, means flexibly connecting said tread plates to said wheel body whereby said plates alternately assume tangential positions relative to said wheel periphery and end to end abutting horizontal positions when in contact with the ground, the total length of the wheel contacting surfaces of said plates being equal to the plate contacting periphery of said wheel.

7. In a tractor wheel, a wheel body, a series of flat tread plates arranged tangentially opposite equal portions of the wheel periphery and the equally spaced portions extending entirely around said wheel periphery and each plate being less in length than the peripheral edge of each opposite portion of the wheel periphery, connecting means between the wheel body and plates whereby rolling contact of each portion of the wheel periphery from end to end of each corresponding plate occurs as each plate is brought into contact with the ground, the contacting surfaces of said tread plates being equal to the periphery of said wheel body.

LEW MAY FISHER,
*Administratrix of the estate of Walter George Fisher, Deceased.*